(12) United States Patent
Duryea

(10) Patent No.: US 8,360,786 B2
(45) Date of Patent: Jan. 29, 2013

(54) POLYSOMNOGRAPHY TRAINING APPARATUS

(76) Inventor: Scott Duryea, Palm Harbor, FL (US)

( * ) Notice: Subject to any disclaimer, the term of this patent is extended or adjusted under 35 U.S.C. 154(b) by 895 days.

(21) Appl. No.: 12/432,442

(22) Filed: Apr. 29, 2009

(65) Prior Publication Data

US 2010/0279263 A1 Nov. 4, 2010

(51) Int. Cl.
*G09B 23/28* (2006.01)
(52) U.S. Cl. .......... 434/262; 434/265; 434/270
(58) Field of Classification Search .......... 434/262
See application file for complete search history.

(56) References Cited

U.S. PATENT DOCUMENTS

| | | | | |
|---|---|---|---|---|
| 3,197,093 | A * | 7/1965 | Doran | 223/66 |
| 3,564,729 | A * | 2/1971 | Ackerman | 34/266 |
| 4,403,962 | A * | 9/1983 | La Vista | 434/94 |
| 5,391,081 | A * | 2/1995 | Lampotang et al. | 434/262 |
| 5,419,729 | A * | 5/1995 | Gross | 446/183 |
| 5,509,810 | A | 4/1996 | Schertz et al. | |
| 5,513,992 | A * | 5/1996 | Refait | 434/267 |
| 6,220,866 | B1 * | 4/2001 | Amend et al. | 434/266 |
| 6,273,728 | B1 | 8/2001 | vanMeurs et al. | |
| 6,461,165 | B1 * | 10/2002 | Takashina et al. | 434/265 |
| 6,575,757 | B1 | 6/2003 | Leight et al. | |
| 6,773,263 | B2 * | 8/2004 | Nicholls et al. | 434/267 |
| 7,465,168 | B2 | 12/2008 | Allen et al. | |
| 7,818,049 | B2 * | 10/2010 | Halperin et al. | 600/509 |
| 2003/0068606 | A1 * | 4/2003 | Nicholls et al. | 434/262 |
| 2004/0234933 | A1 * | 11/2004 | Dawson et al. | 434/262 |
| 2005/0042589 | A1 | 2/2005 | Hatlestad et al. | |
| 2006/0019224 | A1 | 1/2006 | Behar et al. | |
| 2006/0189901 | A1 * | 8/2006 | Flaherty et al. | 600/595 |
| 2006/0190823 | A1 * | 8/2006 | Cunningham et al. | 715/701 |
| 2007/0054254 | A1 | 3/2007 | Cook et al. | |
| 2007/0243512 | A1 | 10/2007 | King | |
| 2007/0292829 | A1 * | 12/2007 | King et al. | 434/268 |
| 2008/0227073 | A1 * | 9/2008 | Bardsley et al. | 434/267 |
| 2008/0293025 | A1 * | 11/2008 | Zamierowsi et al. | 434/262 |
| 2008/0293029 | A1 | 11/2008 | Wilkins et al. | |
| 2009/0011394 | A1 | 1/2009 | Meglan et al. | |
| 2009/0061404 | A1 * | 3/2009 | Toly | 434/262 |

* cited by examiner

*Primary Examiner* — Robert J Utama
(74) *Attorney, Agent, or Firm* — Larson & Larson, P.A.; Frank Liebenow; Justin P. Miller

(57) ABSTRACT

A patient simulator for training a person to perform a polysomnography including a mannequin representing a torso and head of a human body made of a rigid material with a skin layer on the surface of the mannequin. The skin layer is made of an artificial skin material that simulates the electrical conductivity and electrical impedance of human skin. The patient simulator further includes a signal generator for generating electrical signals that simulate biophysiological activity. A plurality of emitter electrodes is positioned underneath the skin layer and connected to the signal generator to receive the electrical signals, and transmit the electrical signals through the skin layer. A controller is connected to the signal generator to control the signal generator that generates the electrical signals.

18 Claims, 6 Drawing Sheets

POLYSOMNOGRAPHY TRAINING APPARATUS

FILED OF THE INVENTION

The present invention relates generally to simulative models for medical training, and more particularly, relating to patient simulator in the form of a human model in communication with a computer system for training persons to perform a competent polysomnography.

BACKGROUND OF THE INVENTION

Polysomnography or PSG is a multi-parametric test used in the study of sleep and as a diagnostic tool in sleep medicine. The test result is called a polysomnogram, also abbreviated PSG. Polysomnography is a comprehensive recording of the biophysiological changes that occur during sleep. It is usually performed at night, when most people sleep, though some labs can accommodate shift workers and people with circadian rhythm sleep disorders and do the test at other times of day. The PSG monitors many body functions including brain (EEG), eye movements (EOG), muscle activity or skeletal muscle activation (EMG) and heart rhythm (ECG) during sleep.

Polysomnography is used to diagnose, or rule out, many types of sleep disorders including narcolepsy, restless legs syndrome, REM behavior disorder, parasomnias, and sleep apnea. It is often ordered for patients with complaints of daytime fatigue or sleepiness that may be caused by interrupted sleep. Although it is not directly useful in diagnosing circadian rhythm sleep disorders, it may be used to rule out other sleep disorders.

An increase of awareness of sleep disorders and a corresponding increase in the number of sleep labs and lab capacity has created an unprecedented demand for formally trained and certified polysomnographic technologist (RPSGT).

Due to this demand, there is a shortage of qualified polysomnographic technologist, and there exists a clear and expressed need for qualified PSG technologists. Some sleep clinics are hiring applicants with no previous patient care experience and are providing on-the-job training for an extended period of time before a polysomnographic technologist can conduct a study.

Accordingly, there is a need for a polysomnography assessment tool to assist in the training and certification of registered polysomnography technologists.

SUMMARY OF THE INVENTION

In general, in one aspect, a patient simulator for training a person on performing a polysomnography is provided. The patient simulator includes a mannequin representing a torso and head of a human body made of a rigid material with a skin layer on the surface of the mannequin. The skin layer being made of an artificial skin material simulating the electrical conductivity and electrical impedance of human skin. The patient simulator further includes a signal generator for generating electrical signals simulating biophysiological activity. A plurality of emitter electrodes positioned underneath the skin layer and connected to the signal generator to receive the electrical signals, and transmit the electrical signals through the skin layer. A controller is connected to the signal generator to control the signal generator to generate the electrical signals.

The electrical signals can include electrical signals simulating the biophysiological activity of the brain of a patient, and wherein a group of emitter electrodes of said plurality of emitter electrodes are positioned to transmit said electrical signals simulating the biophysiological activity of the brain of a patient through said skin surface representing the receptor locations of actual electrical signals generated by brain activity of patient.

The electrical signals can include electrical signals simulating the biophysiological activity of the eyes of a patient, and wherein a group of emitter electrodes of said plurality of emitter electrodes are positioned to transmit said electrical signals simulating the biophysiological activity of the eyes of the patient through said skin surface representing the receptor locations of actual electrical signals generated by eye activity of a patient.

The electrical signals can include electrical signals simulating the biophysiological activity of the heart of a patient, and wherein a group of emitter electrodes of said plurality of emitter electrodes are positioned to transmit said electrical signals simulating the biophysiological activity of the heart of the patient through said skin surface representing the receptor locations of actual electrical signals generated by heart activity of a patient.

The electrical signals can include electrical signals simulating the biophysiological activity of the muscles of a patient, and wherein a group of emitter electrodes of said plurality of emitter electrodes are positioned to transmit said electrical signals simulating the biophysiological activity of the muscles of the patient through said skin surface representing the receptor locations of actual electrical signals generated by muscle activity of a patient.

Hair strands implanted into said skin layer representing hair features of a patient. The plurality of emitter electrodes can be positioned below the exterior surface of said mannequin. The mannequin can have a hollow interior and wherein said head of said mannequin is split into separate sections, at least one of which, is removable from said mannequin to permit access to said hollow interior thereof. A skin layer attachment means can be on said mannequin for removably attaching said skin later to said mannequin. The mannequin can have a hollow interior and has a flat back surface including an opening to said hollow interior. The controller can include operator inputs for effecting the operation of said signal generator.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Figure 1:
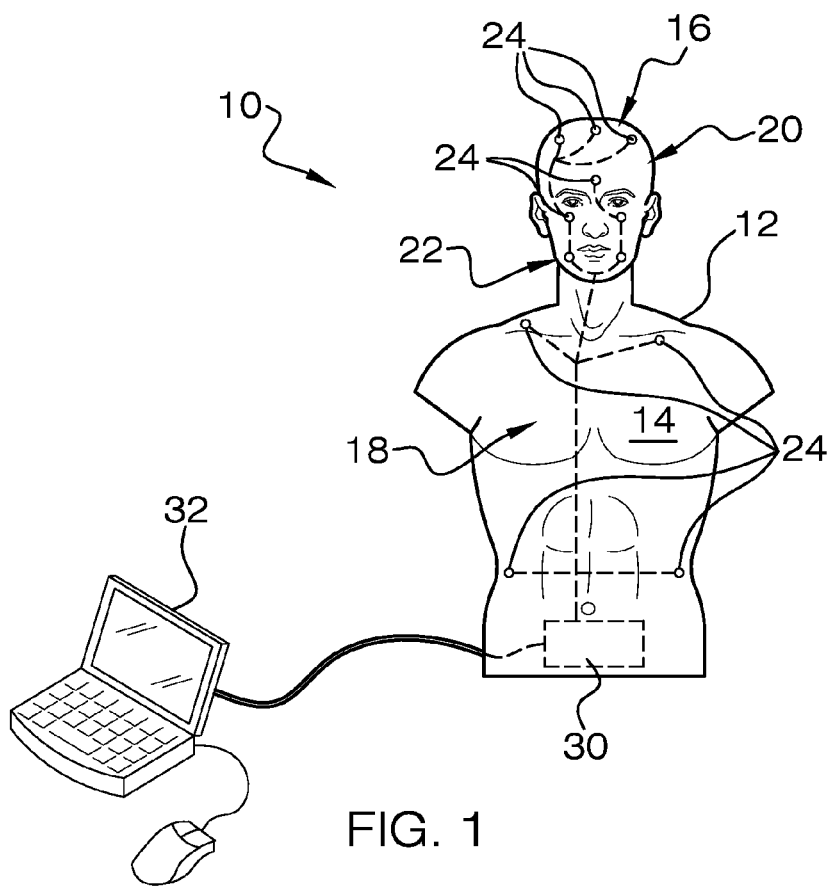
FIG. 1 is a diagrammatic view of a polysomnography training apparatus constructed in accordance with the principles of the present invention.

In FIG. 1, there is depicted a polysomnography training apparatus 10 including a mannequin 12 to which is attachable various sensor electrodes for connection to polysomnography equipment (not shown) to train a technician in correct sensor electrode placement, operation of the polysomnography equipment, and performing a polysomnograhgy (PSG). The polysomnography training device 10 is particularly useful in teaching technician in sensor electrode placement and recording biophysiological activity in electroencephalography (EEG), electrocardiography (ECG), ectro-oculogram (EOG), and electromyography (EMG).

The mannequin 12 is a model of a human torso and head, and is constructed of a material such that the mannequin is self supporting and retains its general shape when being pressed against, for example during placement of sensor electrodes. The mannequin 12 can be constructed of material such as but not limited to urethane foam and plastics. The mannequin 12 is covered by a skin layer 14, best seen in FIG. 7. The skin layer 14 covers at least the front of the torso and the complete head of the mannequin. Anatomical features can be painted on the skin layer 14 to provide a more life-like appearance. The skin layer 14 can provide an impression and a physical sensation that are as close as possible to an actual patient.

The mannequin 12 has biophysiological activity electrical signal generating positions, which are related to electrical activity along the scalp produced by the firing of neurons within the brain, in EEG position 16; related to the electrical activity of the heart, in ECG position 18; related to the voltage difference between cornea and retina as a function of eye movement, in EOG position 20; and related to the electrical potential generated by muscle cells when these cells are mechanically active, in EMG position 22.

Figure 2:
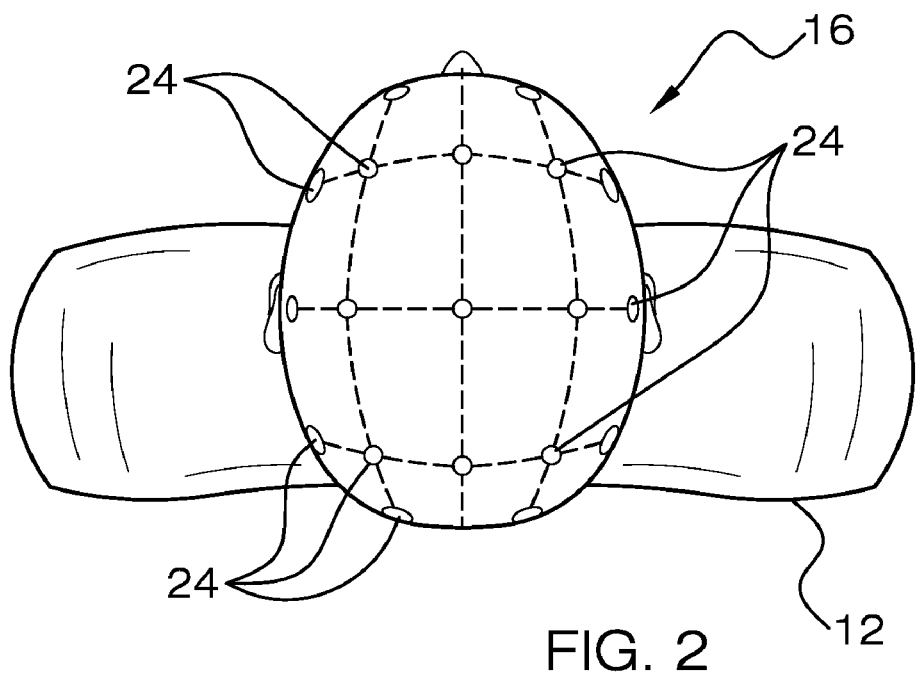
FIG. 2 is a top diagrammatic view of a mannequin of a polysomnography training apparatus, showing emitter electrodes positioned on the head of the mannequin according to the international 10-20 electrode placement system.
Figure 3:
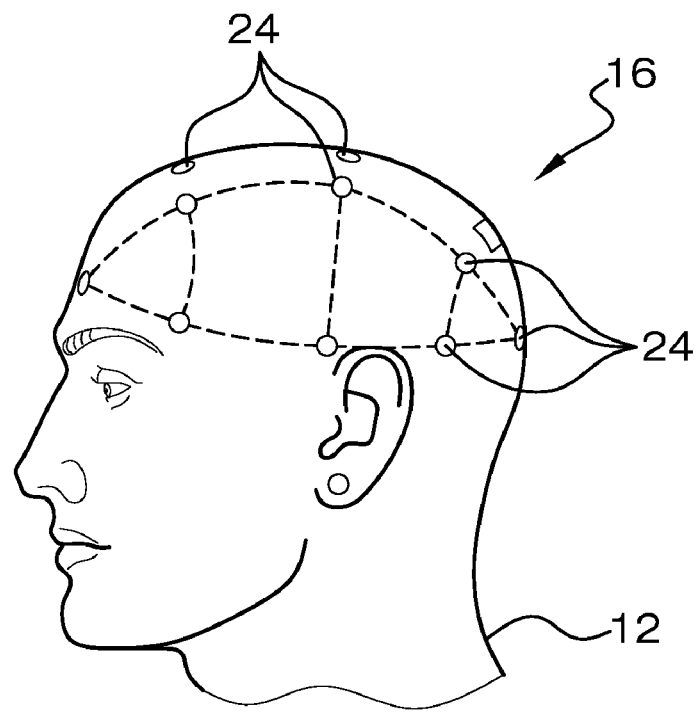
FIG. 3 is partial side diagrammatic view of a mannequin of a polysomnography training apparatus, showing emitter electrodes positioned on the head of the mannequin according to the international 10-20 electrode placement system.
Figure 4:
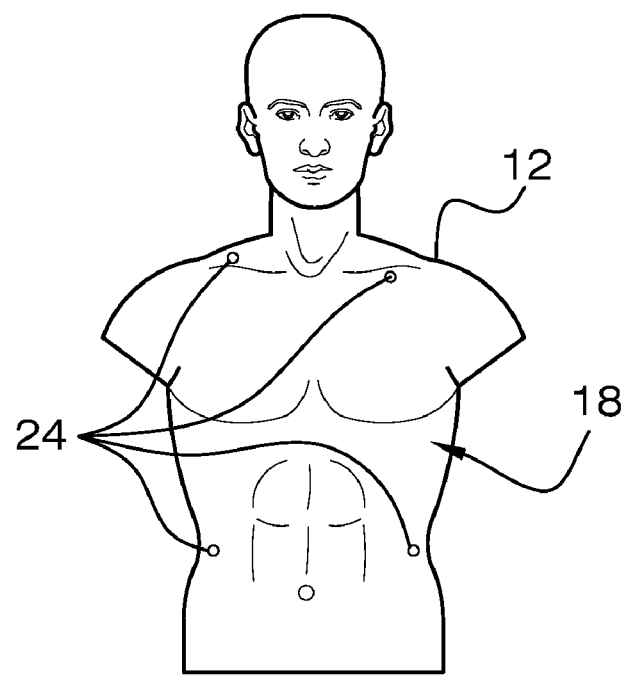
FIG. 4 is a front diagrammatic view of a mannequin of a polysomnography training apparatus, showing emitter electrodes positioning for ECG.
Figure 5:
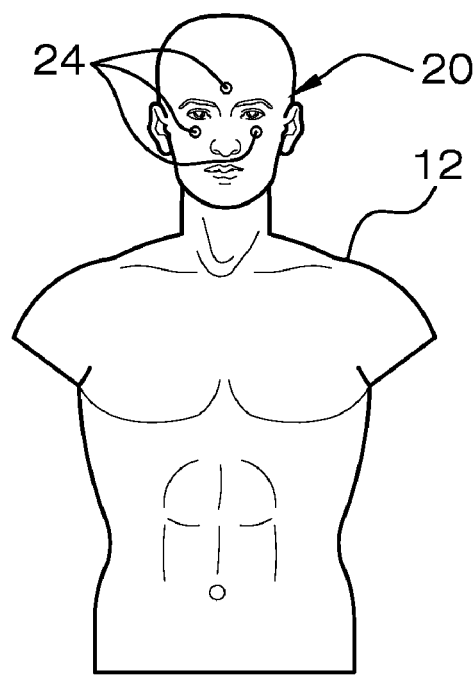
FIG. 5 is a front diagrammatic view of a mannequin of a polysomnography training apparatus, showing emitter electrodes positioning for EOG.
Figure 6:
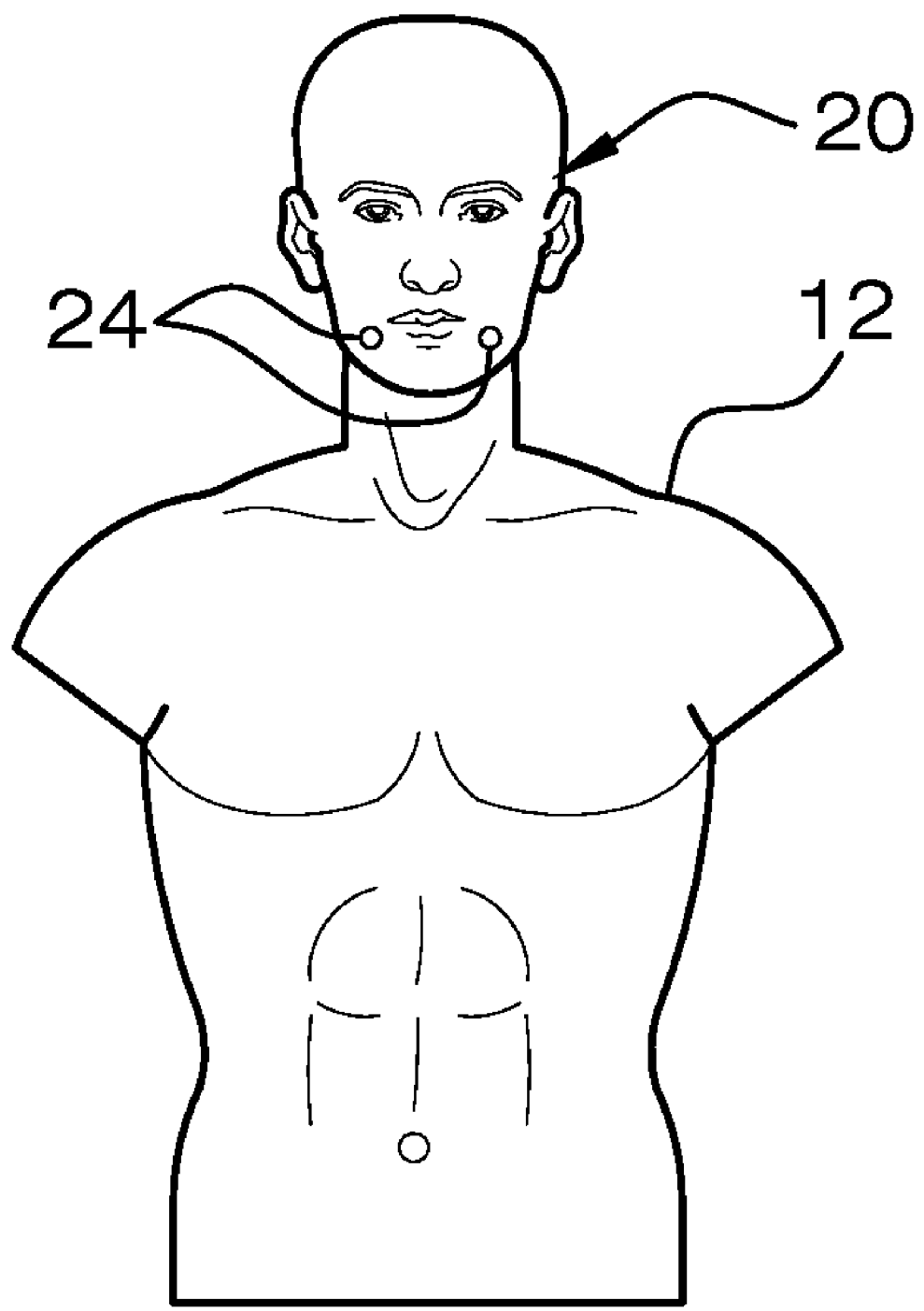
FIG. 6 is a front diagrammatic view of a mannequin of a polysomnography training apparatus, showing emitter electrodes positioning for EMG.

Electrical signal emitter electrodes 24 are positioned in biophysiological activity electrical signal generating positions 16, 18, 20, and 22 representing the receptor locations of actual electrical signals generated by biophysiological activity of a human in corresponding anatomical regions. Emitter electrodes 24 in EEG position 16 can be positioned, for example according to either the International 10-20 electrode placement system, as depicted in FIGS. 2 and 3, or the International 10-10 electrode placement system. Emitter electrodes in ECG position 18 can be positioned, for example to permit various channels of ECG recording and a corresponding number of sensor electrodes. In FIG. 4, the mannequin 12 is depicted as including four ECG emitter electrodes 24 according to the positioning of a four-channel ECG sensor electrode arrangement. Emitter electrodes 24 in the EOG position 20 can be positioned according to standard sensor electrode placement at the cheek bone toward the outer canthi of each eye, with a common reference at the Fp location as described in the International 10-20 electrode placement system, see FIG. 5. Emitter electrodes in EMG position can be positioned according to sensor electrode placement near the masseter musculature of the lower jaw at opposite sides thereof, see FIG. 6.

Figure 7:
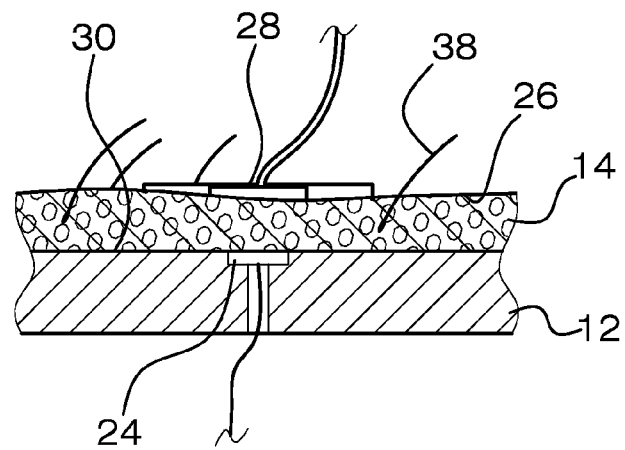
FIG. 7 is a partial cross-sectional view through a mannequin and skin layer of a polysomnography training apparatus.

With reference to FIG. 7, there is shown a cross-section through the skin layer 14 and mannequin 12, each emitter electrode 24 is positioned below the top surface 26 of the skin layer to prevent a student from visually locating the emitter electrode position and aiding in the placement of a sensor electrode 28. While it is depicted as the emitter electrode 24 being positioned entirely below the skin layer 14 and recessed into exterior surface 30 of the mannequin 12, the emitter electrode could be embedded within the skin layer below surface 26. Additionally, while not preferred, each emitter electrode 24 could be positioned to be flush with the skin layer 14 at surface 26, or positioned above surface 26.

In embodiments, where emitter electrodes 24 are positioned below the top surface 26 of the skin layer 14, the skin layer is preferably made of an artificial skin material that is locally electrically conductive, i.e. electrical energy is quickly broken down/absorbed by the skin material as it is conducted by the skin layer in a direction away from the emitter electrode. The skin layer 14 is of a thickness which permits electrically energy to be transmitted across the thickness of the skin layer without being greatly transmitted laterally through the skin layer, which otherwise would effect the sensing of electrical signals from near-by emitter electrodes. Preferably, the skin layer 14 is made of an artificial skin material that simulates the electrical conductivity and electrical impedance of human skin.

With continued reference to FIG. 7, hair strands 38 can be embedded in the skin layer to the change in electrical impedance of electrical signals emitted by emitter electrodes 24 to simulate real-life situations. Further, hair strands 38 increase the difficulty of attaching sensor electrodes to the mannequin 12 as it would be to hair covered skin surfaces of a real patient.

Figure 8:
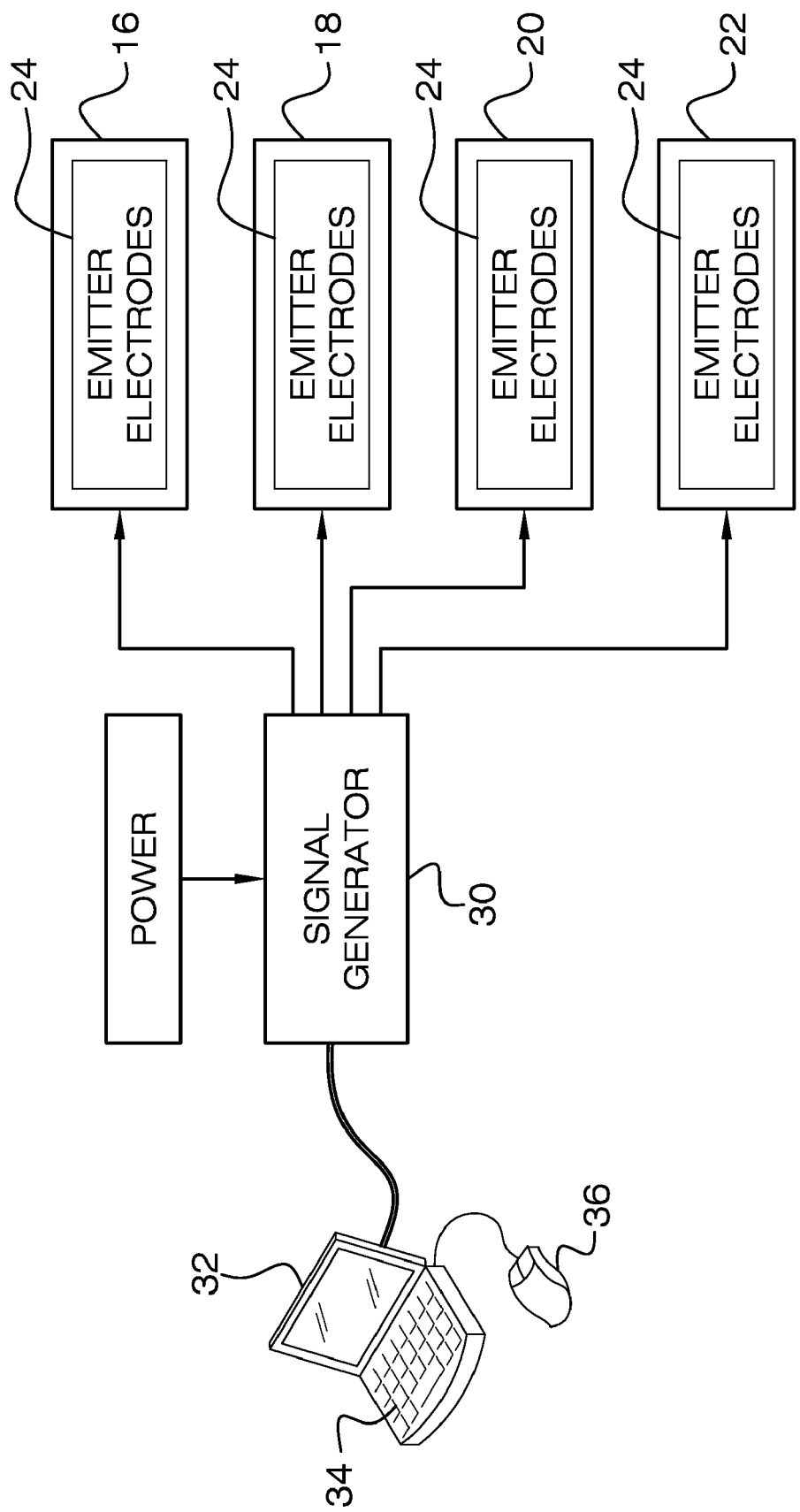
FIG. 8 is a diagrammatic view of a control system of a polysomnography training apparatus.

With reference to FIG. 8, polysomnography training apparatus 10 further includes a signal generator 30 to which each emitter electrode 24 is electrically connected. The signal generator 30 is operable by a controller 32, for example a PC, to control the generation of electrical signals simulating biophysiological activity. Electrical signals simulating biophysiological activity are received by emitter electrodes 24, which then transmit the electrical signals so as to be sensed by sensor electrodes positioned on the mannequin 12 and to be recorded by the polysomnography equipment to which the sensor electrodes are connected. When emitter electrodes 24 are positioned below surface 26, the emitter electrodes transmit the electrical signals simulating biophysiological activity through the skin layer 14.

The signal generator 30 is operable to generate electrical signals simulating the biophysiological activity of the brain, to generate electrical signals simulating the biophysiological activity of the heart, to generate electrical signals sumilating the biophysiological activity of the eyes, and/or to generate electrical signals simulating the biophysiological activity of muscle.

The controller 32 is programmed to effect the control of the signal generator 30 in generating electrical signals simulating biophysiological activity. Creating program logic and software to facilitate such control is well within the ordinary skill of a software programmer. The controller 32 can include operator inputs, such as a keyboard 34 or pointing device 36 to control operation of the signal generator 30.

Figure 9:
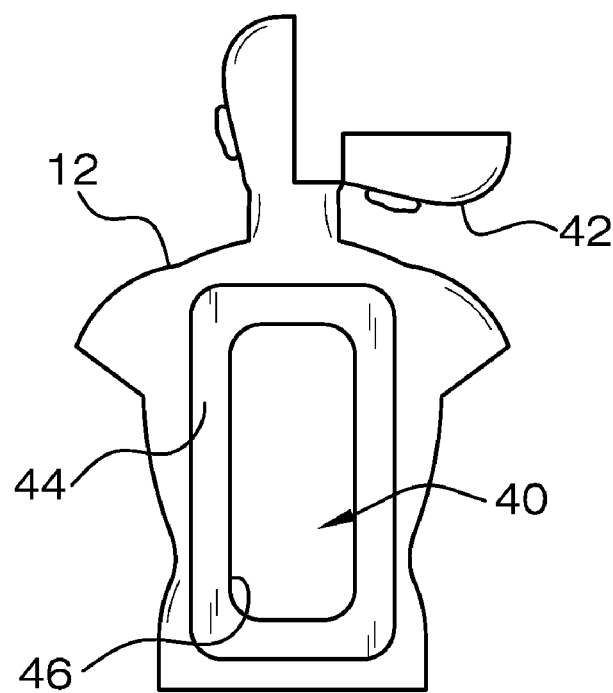
FIG. 9 is a rear diagrammatic view of a a mannequin of a polysomnography training apparatus.
Figure 10:
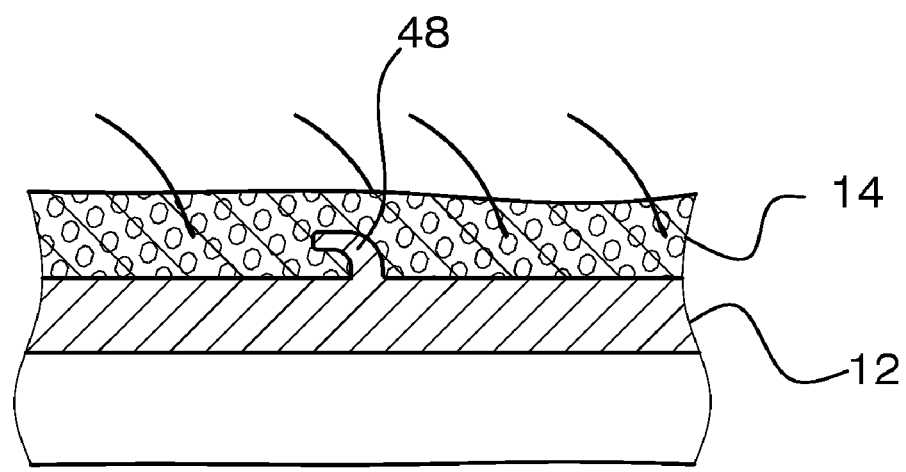
FIG. 10 is a partial cross-section view through a mannequin and skin layer of a polysomnography training apparatus.

Modifications are possible, and with reference to FIG. 9, the mannequin 12 can have a hollow interior 40 and the head of the mannequin can include a section 42 that is removable or positionable to permit access into the hollow interior. The back 44 of the mannequin can include an opening 46 into the hollow interior. The back 44 can be flat to permit the mannequin 12 to be rested on a flat surface without rolling. In FIG. 10, the skin layer 14 can be removably attached to the mannequin 12. In one embodiment, the skin layer 14 can be removably attached to the mannequin 12 through engagement of hook portions 48.

A number of embodiments of the present invention have been described. Nevertheless, it will be understood that various modifications may be made without departing from the spirit and scope of the invention. Accordingly, other embodiments are within the scope of the following claims.

What is claimed is:

1. A patient simulator for training a person to perform a polysomnography, the patient simulator comprising:
   a mannequin representing a torso and head of a human body, said mannequin being made of a rigid material;
   a skin layer on the surface of said mannequin, said skin layer being made of an artificial skin material simulating the electrical conductivity and electrical impedance of human skin;
   a signal generator for generating electrical signals simulating biophysiological activity;
   a plurality of emitter electrodes positioned underneath said skin layer and connected to said signal generator to receive said electrical signals, and transmit said electrical signals through said skin layer; and
   a controller connected to said signal generator to control said signal generator to generate said electrical signals;
   wherein said electrical signals include electrical signals simulating the biophysiological activity of the brain of a patient, and wherein a group of emitter electrodes of said plurality of emitter electrodes is positioned to transmit said electrical signals simulating the biophysiological activity of the brain of a patient through said skin surface representing the receptor locations of actual electrical signals generated by brain activity of patient.

2. A patient simulator for training a person to perform a polysomnography, the patient simulator comprising:
   a mannequin representing a torso and head of a human body, said mannequin being made of a rigid material;
   a skin layer on the surface of said mannequin, said skin layer being made of an artificial skin material simulating the electrical conductivity and electrical impedance of human skin;
   a signal generator for generating electrical signals simulating biophysiological activity;
   a plurality of emitter electrodes positioned underneath said skin layer and connected to said signal generator to receive said electrical signals, and transmit said electrical signals through said skin layer; and
   a controller connected to said signal generator to control said signal generator to generate said electrical signal;
   wherein said electrical signals include electrical signals simulating the biophysiological activity of the eyes of a patient, and wherein a group of emitter electrodes of said plurality of emitter electrodes is positioned to transmit said electrical signals simulating the biophysiological activity of the eyes of the patient through said skin surface representing the receptor locations of actual electrical signals generated by eye activity of a patient.

3. The patient simulator of claim 1,
   wherein said electrical signals include electrical signals simulating the biophysiological activity of the heart of a patient, and wherein a group of emitter electrodes of said plurality of emitter electrodes are positioned to transmit said electrical signals simulating the biophysiological activity of the heart of the patient through said skin surface representing the receptor locations of actual electrical signals generated by heart activity of a patient.

4. The patient simulator of claim 1,
   wherein said electrical signals include electrical signals simulating the biophysiological activity of the muscles of a patient, and wherein a group of emitter electrodes of said plurality of emitter electrodes are positioned to transmit said electrical signals simulating the biophysiological activity of the muscles of the patient through said skin surface representing the receptor locations of actual electrical signals generated by muscle activity of a patient.

5. The patient simulator of claim 1, further comprising:
   hair strands implanted into said skin layer representing hair features of a patient.

6. The patient simulator of claim 1,
   wherein said plurality of emitter electrodes are positioned below the exterior surface of said mannequin.

7. The patient simulator of claim 1,
   wherein said mannequin has a hollow interior and wherein said head of said mannequin is split into separate sections, at least one of which, is removable from said mannequin to permit access to said hollow interior thereof.

8. The patient simulator of claim 1, further comprising:
   a skin layer attachment means on said mannequin for removably attaching said skin later to said mannequin.

9. The patient simulator of claim 1,
   wherein said mannequin has a hollow interior and has a flat back surface including an opening to said hollow interior.

10. The patient simulator of claim 1,
    wherein said controller includes operator inputs for affecting the operation of said signal generator.

11. The patient simulator of claim 2,
wherein said electrical signals include electrical signals simulating the biophysiological activity of the heart of a patient, and wherein a group of emitter electrodes of said plurality of emitter electrodes are positioned to transmit said electrical signals simulating the biophysiological activity of the heart of the patient through said skin surface representing the receptor locations of actual electrical signals generated by heart activity of a patient.

12. The patient simulator of claim 2,
wherein said electrical signals include electrical signals simulating the biophysiological activity of the muscles of a patient, and wherein a group of emitter electrodes of said plurality of emitter electrodes are positioned to transmit said electrical signals simulating the biophysiological activity of the muscles of the patient through said skin surface representing the receptor locations of actual electrical signals generated by muscle activity of a patient.

13. The patient simulator of claim 2, further comprising:
hair strands implanted into said skin layer representing hair features of a patient.

14. The patient simulator of claim 2,
wherein said plurality of emitter electrodes are positioned below the exterior surface of said mannequin.

15. The patient simulator of claim 2,
wherein said mannequin has a hollow interior and wherein said head of said mannequin is split into separate sections, at least one of which, is removable from said mannequin to permit access to said hollow interior thereof.

16. The patient simulator of claim 2, further comprising:
a skin layer attachment means on said mannequin for removably attaching said skin later to said mannequin.

17. The patient simulator of claim 2,
wherein said mannequin has a hollow interior and has a flat back surface including an opening to said hollow interior.

18. The patient simulator of claim 2,
wherein said controller includes operator inputs for affecting the operation of said signal generator.

\* \* \* \* \*